(12) United States Patent
Duan et al.

(10) Patent No.: US 7,100,239 B2
(45) Date of Patent: *Sep. 5, 2006

(54) HINGE ASSEMBLY

(75) Inventors: Chao Duan, Shenzhen (CN); Rui-Hao Chen, Shenzhen (CN); Chia-Hua Chen, Tu-Cheng (TW)

(73) Assignee: FIH Co., Ltd., (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/012,945

(22) Filed: Dec. 14, 2004

(65) Prior Publication Data

US 2005/0188502 A1 Sep. 1, 2005

(30) Foreign Application Priority Data

Feb. 28, 2004 (CN) .................. 2004 2 0043233

(51) Int. Cl.
*E05F 1/02* (2006.01)
(52) U.S. Cl. .................. 16/303; 16/340; 16/330
(58) Field of Classification Search .................. 16/284, 16/367, 321, 335, 336, 327, 328, 338, 340, 16/303, 330, 241, 246, 342, 2.1, 273; 455/575.1, 455/575.3; 379/433.13, 434; 361/683, 803; 29/11
See application file for complete search history.

(56) References Cited

U.S. PATENT DOCUMENTS 2,588,258 A * 3/1952 Lowman .................. 16/243
6,101,676 A * 8/2000 Wahl et al. .................. 16/342
6,141,831 A * 11/2000 Novin et al. .................. 16/330
6,175,990 B1 1/2001 Kato et al.
6,658,699 B1 * 12/2003 Huong .................. 16/330
6,772,481 B1 * 8/2004 Oshima et al. .................. 16/330
2004/0177477 A1 * 9/2004 Hsieh .................. 16/303

FOREIGN PATENT DOCUMENTS

JP 2003065320 A * 3/2003

* cited by examiner

*Primary Examiner*—Chuck Y. Mah
*Assistant Examiner*—Mark T. Vogelbacker
(74) *Attorney, Agent, or Firm*—Morris Manning & Martin LLP; Tim Tingkang Xia, Esq.

(57) ABSTRACT

A hinge assembly includes a body drive member (10) having an outer screw thread (12) on an outer periphery thereof, a cover drive member (20) having a first end surface (28) formed one end thereof, a follower (30) having a second end surface (34) formed on one end thereof, and an elastic element (40) abutting the follower. The cover drive member has an inner screw thread (26) formed in a cavity (22) of the cover drive member. The follower has a central hole (32). The body drive member extends through the cover drive member, the follower and the elastic element, thereby integrating the hinge assembly into a complete unit. The outer screw thread of the body drive member engages with the inner screw thread of the cover drive member, and the first end surface of the cover drive member engaging with the second end surface of the body drive member.

16 Claims, 5 Drawing Sheets

HINGE ASSEMBLY

CROSS-REFERENCE TO RELATED APPLICATIONS

Relevant subject matter is disclosed in co-pending U.S. Patent Application entitled "HINGE ASSEMBLY FOR FOLDABLE ELECTRONIC DEVICE", application Ser. No. 10/904,797, filed on Nov. 30, 2004 with the same assignee as the instant application. The disclosure of the above identified application is incorporated herein by reference.

BACKGROUND OF THE INVENTION

1. Field of the Invention

The present invention relates to hinge assemblies, and particularly to a hinge assembly for foldable electronic devices such as mobile telephones, electronic notebooks, and so on.

2. Description of Prior Art

With the development of the technologies of wireless communication and information processing, portable electronic devices such as mobile telephones and electronic notebooks are now in widespread use. These electronic devices enable consumers to enjoy the convenience of high technology services anytime and anywhere. Foldable electronic devices are particularly favored by consumers for their convenience.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body.

U.S. Pat. No. 6,175,990 issued on Jan. 23, 2001 provides a hinge assembly used in a small-size foldable electronic device such as a portable telephone, a portable computer, an electronic notebook or the like. As represented in FIG. 7, the hinge assembly includes a shaft 100 provided with a discoid head 102 on a first end portion thereof, a fixing member 200, a fixed cam 300, a rotary sliding cam 400, and a compression spring 502. An opposite second end portion of the shaft 100 is passed through the fixed cam 300, the rotary sliding cam 400, the compression spring 502 and the fixing member 200 in that order, thereby integrating the hinge assembly into a complete unit.

The fixed cam 300 abuts the head 102 of the shaft 100, and is rotatable relative to the shaft 100. A pair of opposite recessed cam portions 302 is defined on an end face of the fixed cam 300. A pair of opposite projection portions 402 is formed on an end face of the rotary sliding cam 400, corresponding to the cam portions 302. With the engagement of the cam portions 302 and the projection portions 402, the fixed cam 300 and the rotary sliding cam 400 are axially movable relative to each other and rotatable relative to each other. The rotary sliding cam 400 is axially movable relative to the shaft 100, and rotatable with the shaft 100. The fixing member 200 is secured around the second end portion of the shaft 100. The compression spring 502 is elastically engaged around the shaft 100 between the rotary sliding cam 400 and the fixing member 200, and continually presses the rotary sliding cam 400 against the fixed cam 300.

When the projection portions 402 of the rotary sliding cam 400 are engaged with the cam portions 302 of the fixed cam 300, the foldable electronic device is in a closed position. When the foldable electronic device is opened, the projection portions 402 move out from engagement with the cam portions 302 onto coplanar end faces of the fixed cam 300. Once the foldable electronic device is opened to an angle of about 160°, the projection portions 402 snappingly engage into the corresponding cam portions 302 and are locked therein. However, during the process of the foldable electronic device being opened, a body and a cover of the foldable electronic device are directly subjected to force produced by the fixed cam 300, the rotary sliding cam 400 and the compression spring 500. This force is liable to cause damage to the body and the cover.

In view of the above-described shortcomings, a new, safer and more durable hinge assembly is desired.

SUMMARY OF THE INVENTION

An object of the present invention is to provide a hinge assembly which can reduce the force it exerts on a foldable electronic device when the foldable electronic device is opened or closed.

A hinge assembly according to the present invention includes a body drive member having an outer screw thread on an outer periphery thereof, a cover drive member having a central cavity, a follower having a second end surface formed on one end thereof, and a elastic element abutting the follower. The cover drive member has a projection and an inner screw thread formed in the cavity. The cover drive member further has a first end surface on one end thereof, the first end surface having a first flat surface and a first arcuate surface. The follower has a central hole. The second end surface has a third flat surface and a second arcuate surface. The body drive member extends through the cavity of the cover drive member, the hole of the follower and the spring, thereby integrating the hinge assembly into a complete unit, the outer screw thread of the body drive member engaging with the inner screw thread of the cover drive member, and the first end surface of the cover drive member engaging with the second end surface of the body drive member.

Other objects, advantages and novel features of the invention will become more apparent from the following detailed description when taken in conjunction with the accompanying drawings, in which:

DETAILED DESCRIPTION OF THE INVENTION

Figure 1:
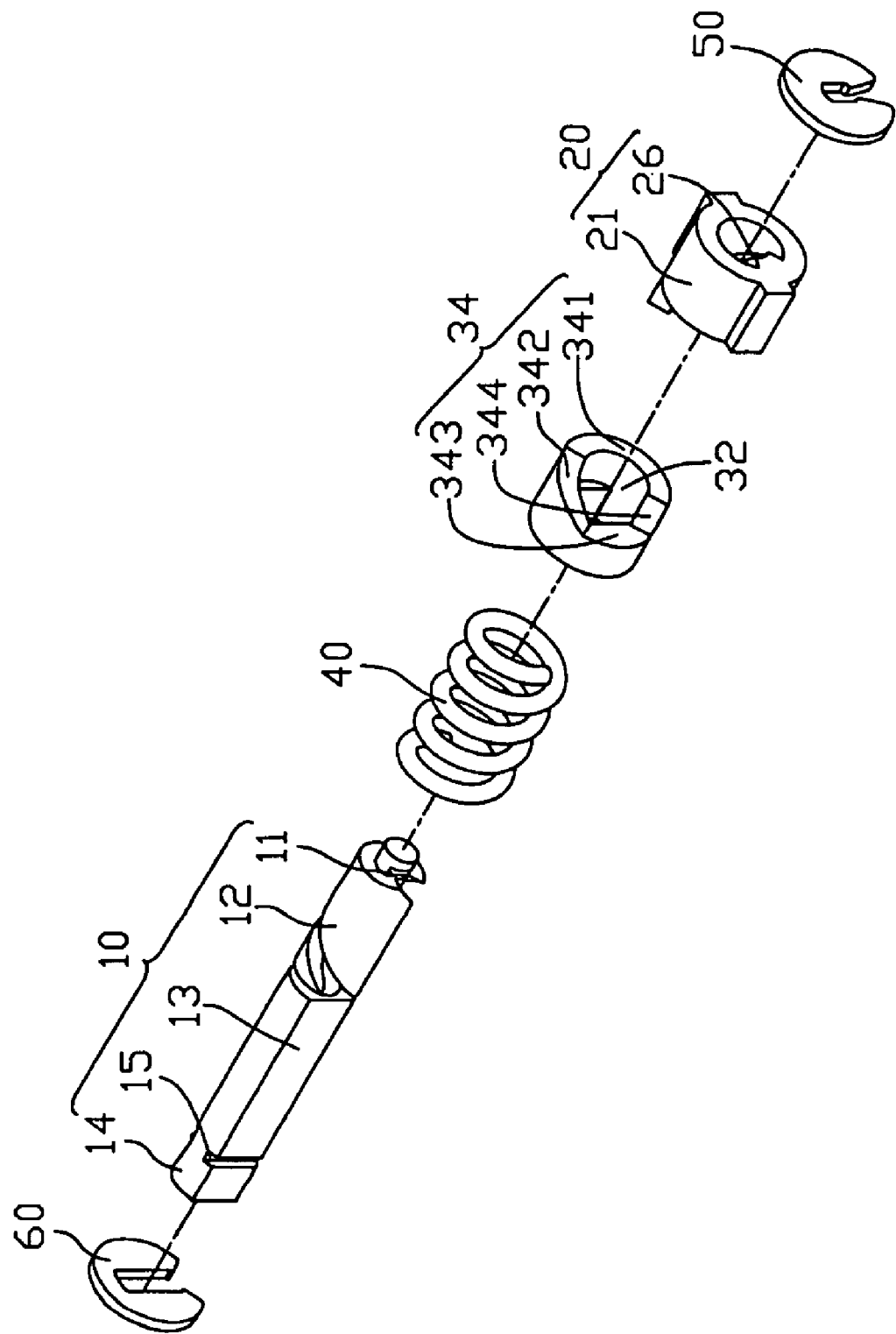
FIG. 1 is an exploded, isometric view of a hinge assembly according to a preferred embodiment of the present invention.
Figure 2:
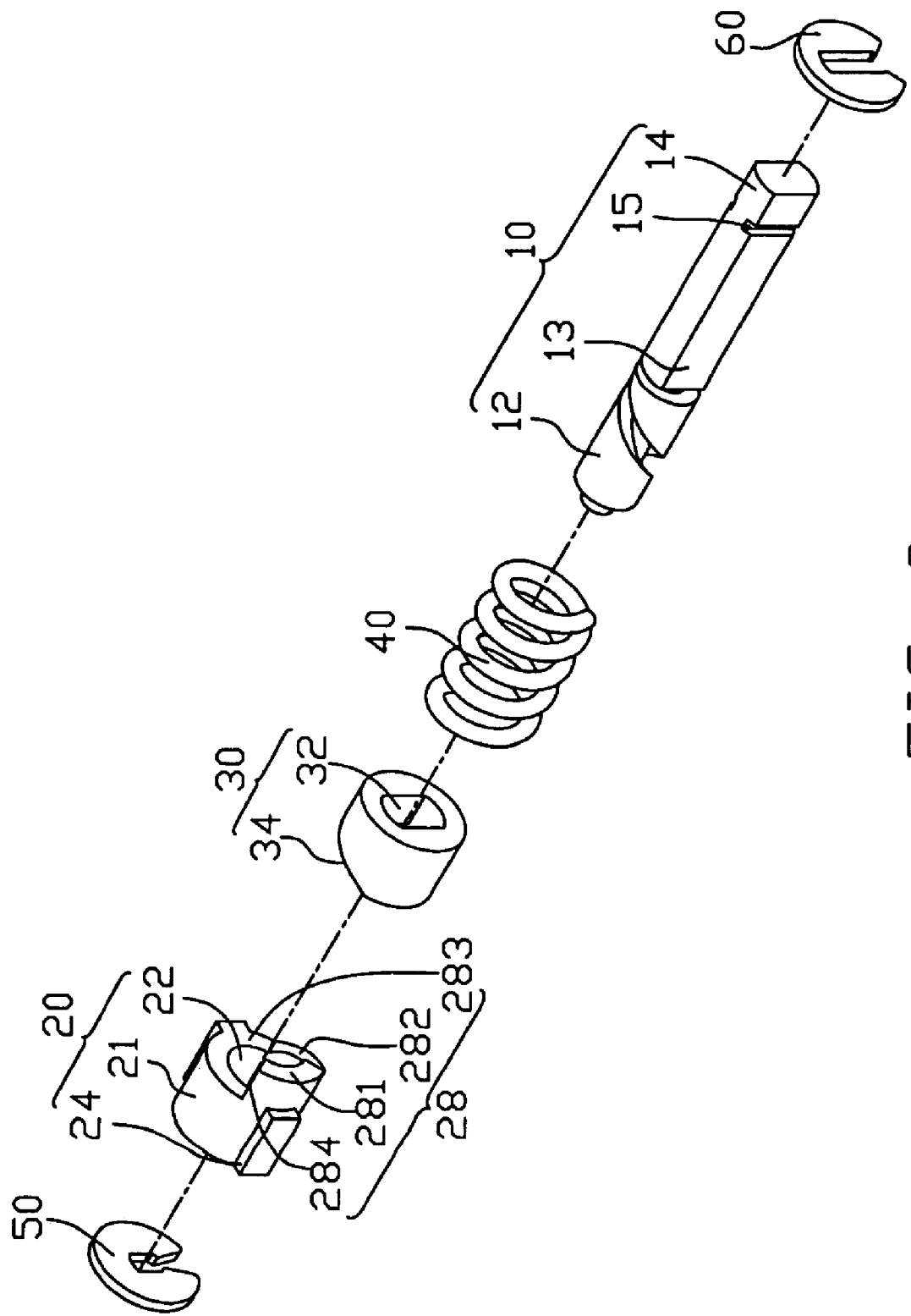
FIG. 2 is similar to FIG. 1, but viewed from a reverse aspect.
Figure 3:
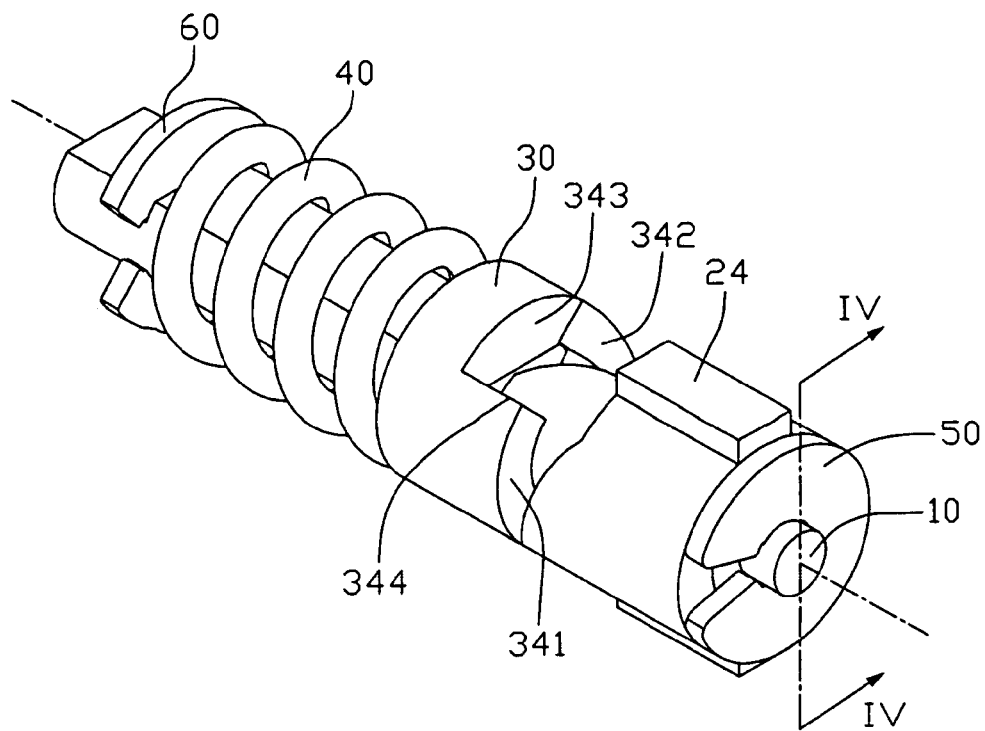
FIG. 3 is an assembled view of the hinge assembly of FIG. 1, but viewed from another aspect, and showing the hinge assembly positioned corresponding to a closed position of a foldable electronic device.

FIG. 3 shows a hinge assembly according to the preferred embodiment of the present invention. The hinge assembly is used to interconnect components like a body (not shown) and a cover (not shown) of a foldable electronic device. Also referring to FIGS. 1 and 2, the hinge assembly includes a body drive member 10, a cover drive member 20, a follower 30, a spring 40, and disks 50, 60. The body drive member 10 extends through the cover drive member 20, the follower 30, the spring 40 and the disks 50, 60, thereby integrating the hinge assembly into a complete unit.

The body drive member 10 is a shaft essentially in the form of a round rod. A pair of grooves 11 is symmetrically defined in a first end of the body drive member 10. An outer screw thread 12 is formed adjacent the grooves 11. The body drive member 10 has a keyed shaft portion 13 adjacent the outer screw thread 12. The keyed shaft portion 13 has two opposite flat surfaces to provide the keying function. An end of the keyed shaft portion 13 defines a lock member 14, which is located at a second end of the body drive member 10 opposite from the first end. The lock member 14 is essentially a keyed cylinder, with two opposite flat surfaces providing the keying function. The lock member 14 is engaged with the body of the foldable electronic device so that the body drive member 10 is rotatable with the body. A pair of slots 15 is symmetrically defined in the keyed shaft portion 13, adjacent the lock member 14.

The cover drive member 20 has a cylindrical body 21 and a central cavity 22. A pair of projections 24 extends from a circumferential periphery of the body 21. The projections 24 are engaged with the cover of the foldable electronic device, so that the cover drive member 20 is rotatable with the cover. An inner screw thread 26 is formed on an inside wall of the body 21. The inner screw thread 26 is engaged with the outer screw thread 12 of the body drive member 10 so that the cover drive member 20 can pivot relative to the body drive member 10. The body 21 has a first end surface 28. The first end surface 28 includes a first flat surface 281, a first arcuate surface 282, a second flat surface 283, and a first stopper portion 284. The first arcuate surface 282 and the first stopper portion 284 are respectively located between the first flat surface 281 and the second flat surface 283.

The follower 30 is a hollow cylinder defining a hole 32. The shape and size of the hole 32 correspond to the shape and size of the keyed shaft portion 13 of the body drive member 10. This is so that when the follower 30 is engaged with the body drive member 10, the follower 30 cannot rotate about the body drive member 10, but can only move along an axial direction of the body drive member 10. The follower 30 has a second end surface 34. The second end surface 34 includes a third flat surface 341, a second arcuate surface 342, a fourth flat surface 343, and a second stopper portion 344. The second arcuate surface 342 and the second stopper portion 344 are respectively located between the third flat surface 341 and the fourth flat surface 343.

The spring 40 is metallic and helical, with an outer diameter smaller than a diameter of the disks 50, 60. The spring 40 is placed around the keyed shaft portion 13 of the body drive member 10. One end of the spring 40 resists the disk 60 and the other end of the spring 40 resists the follower 30.

The disks 50, 60 are made of a resin such as nylon. Each of the disks 50, 60 defines a generally Y-shaped notch (not labeled). This enables the disks 50, 60 to be snappingly secured on the body drive member 10 in the grooves 11 and slots 15 respectively. A diameter of the disk 60 is larger than an inner diameter of the spring 40.

In assembly of the hinge assembly, the second end of the body drive member 10 is passed through the cavity 22 of the cover drive member 20, the hole 32 of the follower 30 and the spring 40 in that order. The first end of the body drive member 10 is rotated into the cavity 22 of the cover drive member 20, with the outer screw thread 12 of the body drive member 10 engaging with the inner screw thread 26 of the cover drive member 20. The keyed shaft portion 13 is thus engaged in the hole 32 of the follower 30. The disks 50, 60 are snappingly engaged in the grooves 11 and slots 15 of the body drive member 10 respectively, and are thus firmly secured on the body drive member 10. One end of the cover drive member 20 abuts the disk 50. The opposite end of the cover drive member 20 abuts the follower 30, with the first end surface 28 of the cover drive member 20 in slidable contact with the second end surface 34 of the follower 30. The hinge assembly is thus completely assembled, as shown in FIG. 3.

Figure 4:
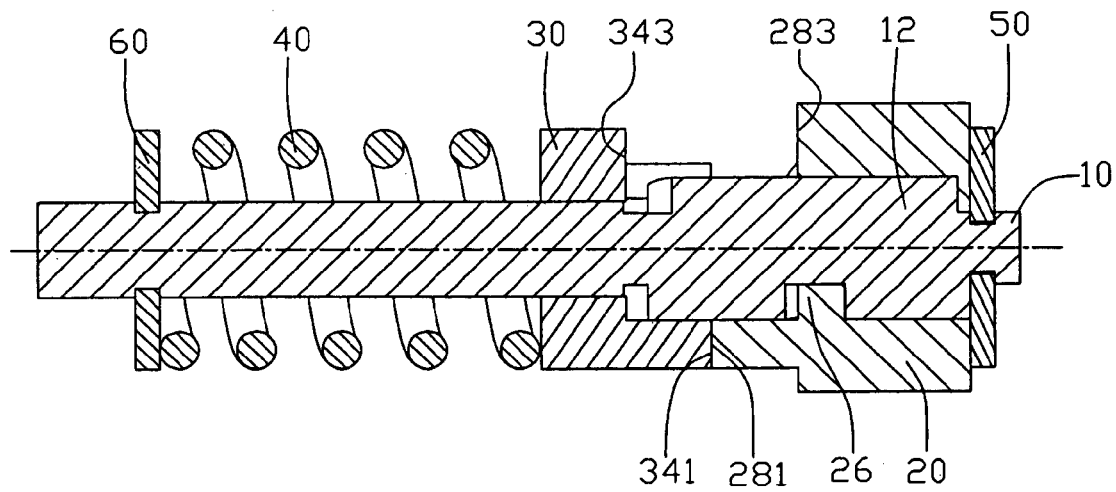
FIG. 4 is a cross-sectional view taken along line IV—IV of FIG. 3.

Referring to FIGS. 3–4, when the cover of the foldable electronic device is in a fully closed position, the first flat surface 281 of the first end surface 28 of the cover drive member 20 abuts against the third flat surface 341 of the second end surface 34 of the follower 30. In this position, the spring 40 is in a compressed state, which helps keep the cover drive member 20 stably locked relative to the follower 30.

Figure 5:
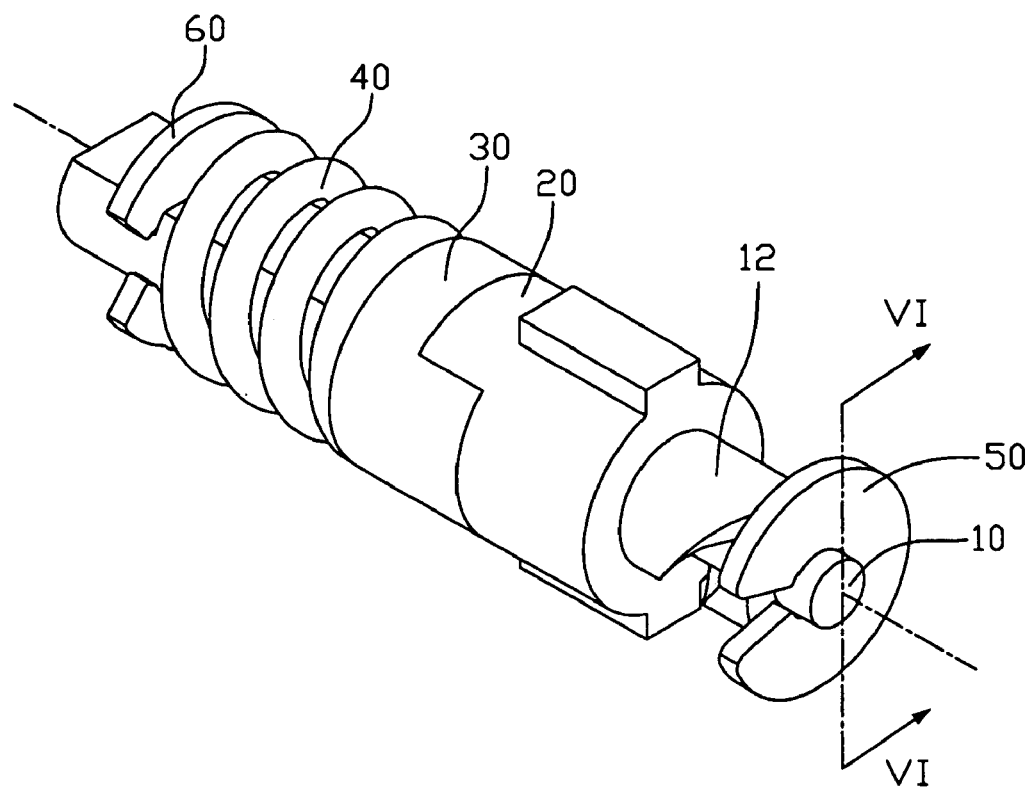
FIG. 5 is similar to FIG. 3, but showing the hinge assembly positioned corresponding to an open position of the foldable electronic device.
Figure 6:
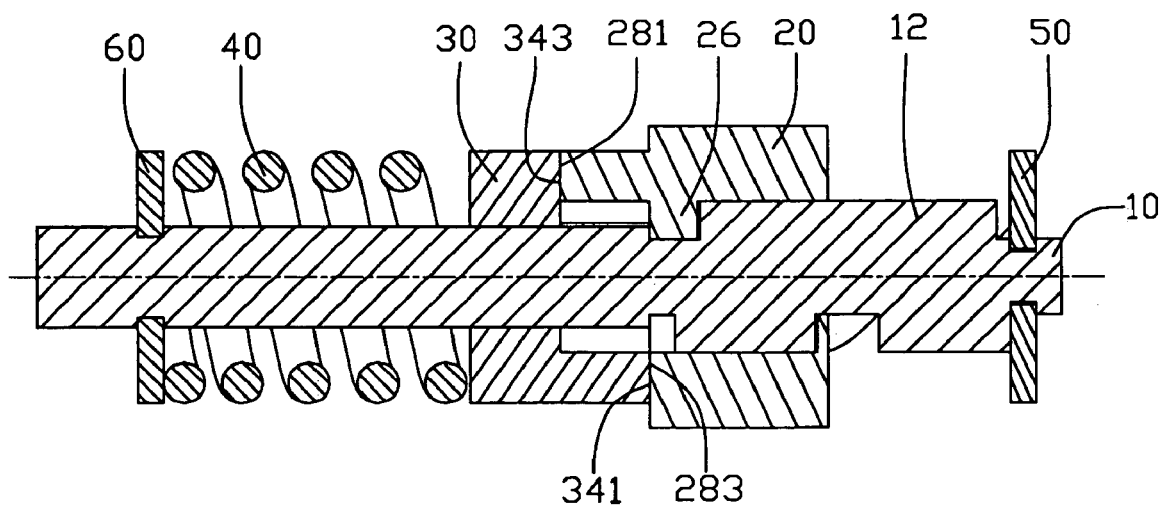
FIG. 6 is a cross-sectional view taken along line VI—VI of FIG. 5.
Figure 7:
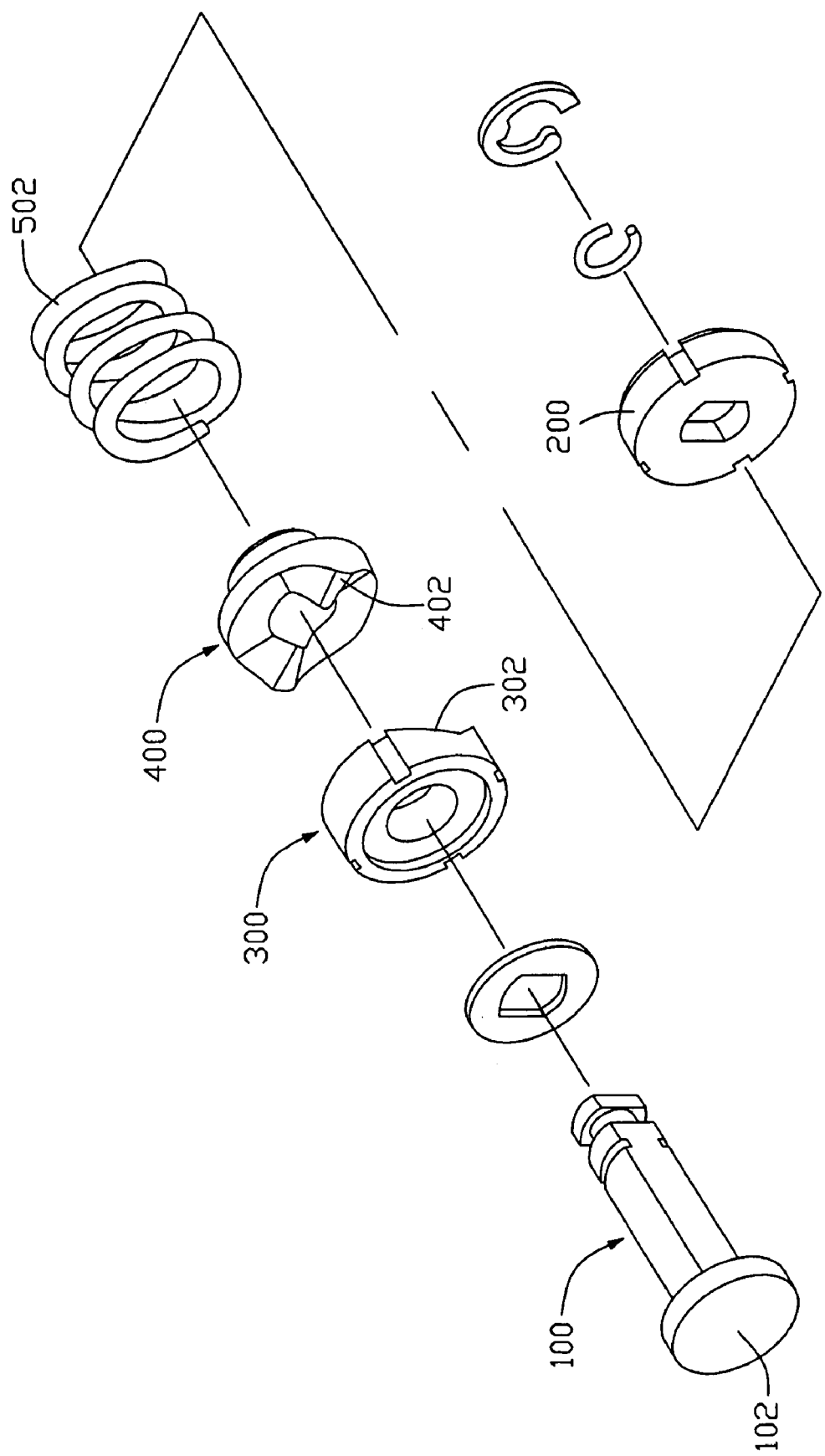
FIG. 7 is an exploded, isometric view of a conventional hinge assembly.

Referring also to FIGS. 5–6, to open the foldable electronic device, the cover is manually rotated up from the body. Hence the cover drive member 20 is rotated about the body drive member 10. With the engagement of the outer screw thread 12 of the body drive member 10 and the inner screw thread 26 of the cover drive member 20, the cover drive member 20 is thereby axially moved away from the disk 50 and pushes the follower 30. In this process, the spring 40 is further compressed. The first flat surface 281 of the first end surface 28 of the cover drive member 20 slides along the third flat surface 341 of the second end surface 34 of the follower 30. When the first flat surface 281 of the first end surface 28 reaches the second arcuate surface 342 of the second end surface 34, the spring 40 decompresses, and the first flat surface 281 of the first end surface 28 rides along the second arcuate surface 342 of the second end surface 34. Simultaneously, the third flat surface 341 of the second end surface 34 rides along the first arcuate surface 283 of the first end surface 28. Therefore the cover drive member 20 rotates until the first stopper portion 284 of the first end surface 28 abuts against the second stopper portion 344 of the second end surface 34. The cover is thus opened automatically to a fully open position under the decompression force of the spring 40.

In the fully open position, the first flat surface 281 of the first end surface 28 abuts the fourth flat surface 343 of the second end surface 34, and the second flat surface 283 of the first end surface 28 abuts the third flat surface 341 of the second end surface 34, as shown in FIGS. 5 and 6. The combined configuration of the first stopper portion 284, first flat surface 281 and first arcuate surface 282 matches the combined configuration of the second stopper portion 344, fourth flat surface 343 and second arcuate surface 342.

Further, the spring 40 is in a compressed state. Thus the cover drive member 20 is stably locked in position relative to the follower 30.

To close the foldable electronic device, the cover is manually rotated down toward the body. Hence the cover drive member 20 is rotated about the body drive member 10. With the engagement of the outer screw thread 12 of the body drive member 10 and the inner screw thread 26 of the cover drive member 20, the cover drive member 20 is thereby axially moved toward the disk 50. As a result, the first flat surface 281 rides along the second arcuate surface 342. The follower 30 moves along the axial direction under decompression force of the spring 40, thus following the cover drive member 20. The first flat surface 281 reaches the third flat surface 341, and the cover is continued to be manually rotated. The first flat surface 281 rides along the third flat surface 341 until the cover drive member 20 abuts the disk 50. The cover is thus once again in the fully closed position, as shown in FIGS. 3 and 4.

During the process of automatic opening of the cover, the spring 40 decompresses and exerts force on the follower 30. The first flat surface 281 rides along the second arcuate surface 342, with friction occurring therebetween. This limits the speed of automatic opening of the cover, so that the cover is protected from damage. In addition, the first stopper portion 284 blocks the second stopper portion 344 and stops the cover from over-rotating, so that the cover is protected from damage. Further, during the processes of manual opening of the cover and manual closing of the cover, the spring 40 exerts force on the follower 30. The resulting friction between the first end surface 28 and the second end surface 34 limits the speed of the cover and protects the cover from damage.

During closing of the cover of the foldable electronic device, when the first flat surface 281 of the first end surface 28 reaches the fourth flat surface 343 of the second end surface 34, the first flat surface 281 can be rotated to any of a variety of positions relative to the fourth flat surface 343. Because both surfaces 281, 343 are flat, and because the spring 40 exerts force on the follower 30, the cover drive member 20 can remain stable relative to follower 30 at any of said positions in which the first flat surface 281 is in contact with the fourth flat surface 343. Accordingly, the cover drive member 20 can be stably held relative to the body drive member 10 at any of said positions. This means that the cover can be stably located at any of a plurality of partly closed positions.

Preferably, the structures of the cover and the main body are also adapted to control the degree of rotation of the hinge assembly, such that the first flat surface 281 can be held in one or more particular locations relative to the second arcuate surface 342.

In alternative embodiments, the spring 40 can be replaced by another kind of elastic element or urging mechanism known in the art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for a foldable electronic device, comprising:

a body drive member, including an outer screw thread at an outer periphery thereof;

a cover drive member including at least one projection on a circumferential periphery thereof, a central cavity, an inner screw thread formed in the cavity, and a first end surface, the first end surface having a first flat surface and a first arcuate surface;

a follower including a second end surface, and a central hole, the second end surface having a third flat surface and a second arcuate surface; and an elastic element abutting the follower;

wherein the body drive member extends through the cavity of the cover drive member, the hole of the follower and the elastic element respectively, thereby integrating the hinge assembly into a complete unit, the outer screw thread of the body drive member engages with the inner screw thread of the cover drive member to guide rotary movement of the cover drive member relative to the body drive member, and the first end surface of the cover drive member abuts the second end surface of the follower under a biasing force applied by the elastic element.

2. The hinge assembly as claimed in claim 1, wherein the body drive member is a shaft essentially in the form of a round rod.

3. The hinge assembly as claimed in claim 2, wherein a first end of the body drive member defines a pair of grooves, the grooves being adjacent the outer screw thread.

4. The hinge assembly as claimed in claim 3, further comprising a first disk defining a notch, the first disk engaging in the grooves of the body drive member.

5. The hinge assembly as claimed in claim 3, wherein the body drive member further includes a keyed shaft portion adjacent the outer screw thread.

6. The hinge assembly as claimed in claim 5, wherein the keyed shaft portion defines a pair of slots.

7. The hinge assembly as claimed in claim 6, further comprising a second disk defining a notch, the second disk engaging in the slots of the body drive member.

8. The hinge assembly as claimed in claim 7, wherein a second end of the body drive member opposite from the first end defines a keyed lock member.

9. The hinge assembly as claimed in claim 5, wherein the follower is a cylinder defining a hole therethrough, the shape and size of the hole corresponding to the shape and size of the keyed shaft portion of the body drive member.

10. The hinge assembly as claimed in claim 1, wherein the second end surface of the follower further has a fourth flat surface, the second arcuate surface of the follower being between the third flat surface and the fourth flat surface.

11. The hinge assembly as claimed in claim 10, wherein the second end surface of the follower further has a stopper portion between the third flat surface and the fourth flat surface.

12. The hinge assembly as claimed in claim 1, wherein the cover drive member is essentially a hollow cylinder.

13. The hinge assembly as claimed in claim 1, wherein the first end surface of the cover drive member further has a second flat surface between the first flat surface and the first arcuate surface.

14. A hinge assembly for interconnecting components of an electronic device, comprising:

a first drive member attached to one of said components and movable together therewith, said first drive member having a screw-thread surface formed thereon;

a second drive member attached to another of said components and movable together therewith, said second drive member having a complementary screw-thread surface formed thereon, wherein engagement of said screw-thread surface and said complementary screw-thread surface guides and leads to rotary movement of said second drive member relative to said first drive member; and a follower installed on said first drive member so as to elastically engage with said second drive member along an axial direction corresponding to said rotary movement of said second drive member;

wherein said second drive member has two offset flat surfaces along said axial direction facing said follower so as to elastically move said follower along said axial direction by means of said two offset flat surfaces.

15. The hinge assembly as claimed in claim 14, wherein said screw-thread surface is formed on an outer periphery of said first drive member while said complementary screw-thread surface is a projection formed in a cavity of said second drive member.

16. A method of installing a hinge assembly to interconnect components of an electronic device, comprising the steps of:

providing a screw-thread surface on a first drive member attached to one of said components and movable together therewith;

providing a complementary screw-thread surface on a second drive member attached to another of said components and movable together therewith;

attaching a follower to said first drive member to allow said follower movable exclusively along an axial direction of said first drive member;

providing two flat surfaces, offset from each other along said axial direction of said first drive member, on an end surface of said second drive member facing said follower;

engaging said screw-thread surface with said complementary screw-thread surface and selectively engaging one of said two flat surfaces of said second drive member with said follower along said axial direction of said first drive member; and allowing said second drive member to move relative to said first drive member by means of an engaging guide of said screw-thread surface and said complementary screw-thread surface, and allowing said follower to move along said axial direction of said first drive member by means of an engaging guide of said one of said two flat surfaces and said follower.

* * * * *